(12) United States Patent
Smith

(10) Patent No.: US 6,937,925 B2
(45) Date of Patent: Aug. 30, 2005

(54) SLOW SPEED CONSIST CONTROL BY INDEPENDENTLY CONTROLLING EACH LOCOMOTIVE

(75) Inventor: Eugene A. Smith, Satellite Beach, FL (US)

(73) Assignee: General Electric Company

( * ) Notice: Subject to any disclaimer, the term of this patent is extended or adjusted under 35 U.S.C. 154(b) by 311 days.

(21) Appl. No.: 10/232,606

(22) Filed: Aug. 29, 2002

(65) Prior Publication Data

US 2004/0044447 A1 Mar. 4, 2004

(51) Int. Cl.[7] .......................... G06F 19/00; B60T 13/74
(52) U.S. Cl. .............................. 701/20; 701/70; 303/7; 303/16; 303/20; 340/424
(58) Field of Search .................................. 701/19, 20, 70, 701/36; 303/7, 16, 20; 246/187, 167; 324/160; 377/24, 24.1, 26; 105/61, 62; 340/424, 172.5, 426, 425.5; 370/282, 432

(56) References Cited

U.S. PATENT DOCUMENTS

| | | | |
|---|---|---|---|
| 4,401,035 A | * | 8/1983 | Spigarelli et al. .............. 105/61 |
| 4,602,335 A | | 7/1986 | Perlmutter |
| 5,053,964 A | | 10/1991 | Mister et al. |
| 5,564,657 A | | 10/1996 | Dimsa et al. |
| 5,570,289 A | | 10/1996 | Stacey et al. |
| 5,629,567 A | | 5/1997 | Kumar |
| 5,950,967 A | | 9/1999 | Montgomery |
| 5,995,737 A | | 11/1999 | Bonissone et al. |
| 6,332,106 B1 | * | 12/2001 | Hawthorne et al. ............ 701/19 |
| 6,401,015 B1 | * | 6/2002 | Stewart et al. ................. 701/19 |
| 6,680,918 B1 | * | 1/2004 | Haley ......................... 370/282 |

* cited by examiner

Primary Examiner—Thomas G. Black
Assistant Examiner—Ronnie Mancho
(74) Attorney, Agent, or Firm—Carl Rowold, Esq.; Enrique J. Mora, Esq.; Beusse, Brownlee, Wolter, Mora & Maire, P.A.

(57) ABSTRACT

A method for controlling locomotive consists at slow speeds by independently controlling each locomotive is provided. The method comprises controlling the throttle settings and main generator excitation of a control locomotive, independently controlling, from the control locomotive, the throttle setting of each of the controlled locomotives, and compensating for a combined consist tractive effort change induced by a change in the throttle setting of each of the controlled locomotives by adjusting the main generator excitation of at least one of the locomotives to maintain a preset consist speed. The method further includes changing the throttle settings concurrently in the control and controlled locomotives, changing the throttle settings of the controlled locomotives only after the control locomotive reaches a maximum generator excitation, and changing the throttle settings according to a rule base. As a result, aspects of the invention enable slow speed control of locomotive consists comprising trail locomotives that may lack main generator excitation remote control, or Slow Speed, capability.

26 Claims, 4 Drawing Sheets

US 6,937,925 B2

SLOW SPEED CONSIST CONTROL BY INDEPENDENTLY CONTROLLING EACH LOCOMOTIVE

FIELD OF THE INVENTION

This invention relates generally to the field of rail transportation, and more particularly, to a slow speed control system for railroad locomotive consists.

BACKGROUND OF THE INVENTION

It is known to control the speed of a locomotive by controlling the locomotive's diesel engine throttles and main generator excitation voltage. In diesel locomotives, the diesel engine turns the main generator and the generator supplies electrical power to the electric traction motors. The amount of tractive effort supplied by the tractive motors is determined by the engine speed of the diesel engines and the excitation of the main generator. Locomotive engine speed is discretely controlled in a series of throttle settings. Each engine speed, or throttle setting, provides a fixed amount of power to the generator, characterized by a sudden increase or decrease in power when the throttle setting is changed. For each throttle setting, a predefined excitation voltage is provided to the main generator that in turn determines the tractive effort supplied by the tractive motors. Examples of such systems are described in U.S. Pat. Nos. 5,629,567; 4,602,335; 4,234,922; and 4,118,774.

It is also known in the art to provide distributed power control system for locomotives (Distributed Power or DP), in which the operation of one or more remote locomotives, or group of locomotives in a train consist, is remotely controlled from a lead locomotive of the train via a hard-wired radio communication link. One such Radio based DP is commercially available under the trade designation Locotrol radius from the General Electric Company and is described in GE's U.S. Pat. No. 4,582,280. Hard wired systems have been available for over 20 years from various vendors and provide communication between locomotives directly connected mechanically together to form a consist and connected electrically via Multiple-Unit (MU) cables to provide intra-consist communication. Typically, MU cables include a dedicated throttle train line to allow remote control of locomotives throttle settings by electrical signals transmitted from a control locomotive to a controlled locomotive along the line. Despite having the capability to communicate with other locomotives, some locomotives are not equipped with the required equipment or modifications to allow remote control of the excitation of the locomotive's main generator and consequently, the locomotives cannot be used in slow speed operations.

BRIEF SUMMARY OF THE INVENTION

Accordingly, a locomotive speed control method and system is needed that is capable of independently controlling each locomotive in a consist to provide precise speed control at slow speeds. The slow speed controller described herein considers combined consist tractive effort and independently controls the locomotives in the consist to maintain a required set speed. By keeping the combined tractive effort of a consist generally constant, such as by independently controlling the throttle of a trail locomotive, and the throttle and main generator excitation of a slow speed equipped control locomotive, improved slow speed control of locomotive consists is realized.

Generally, the method comprises the slow speed equipped lead locomotive idling the trail locomotives and adjusting the lead locomotive's throttle and main generator excitation to maintain a set slow speed. As additional tractive effort is required, the lead locomotive advances the throttle of the trail locomotives and, as the trail locomotive's tractive effort increases, the tractive effort of the lead locomotive is reduced by varying the generator excitation to keep the total consist tractive effort constant. In one embodiment, the throttle control of the trail locomotives tracks the lead locomotive throttle control. In another embodiment, the throttles of the trail locomotives are controlled independently of the lead locomotive throttles and lags the lead locomotive throttle steps. In yet another embodiment, the throttles of the trail locomotives are controlled independently of the lead locomotive throttles, wherein the throttle control is accomplished according to a predetermined schedule. Advantageously, the method and system for slow speed consist control works with existing equipment, even if the trail locomotive lacks main generator excitation remote control capability.

BRIEF DESCRIPTION OF THE DRAWINGS

The features and advantages of the present invention will become apparent from the following detailed description of the invention when read with the accompanying drawings wherein.

Figure 1:
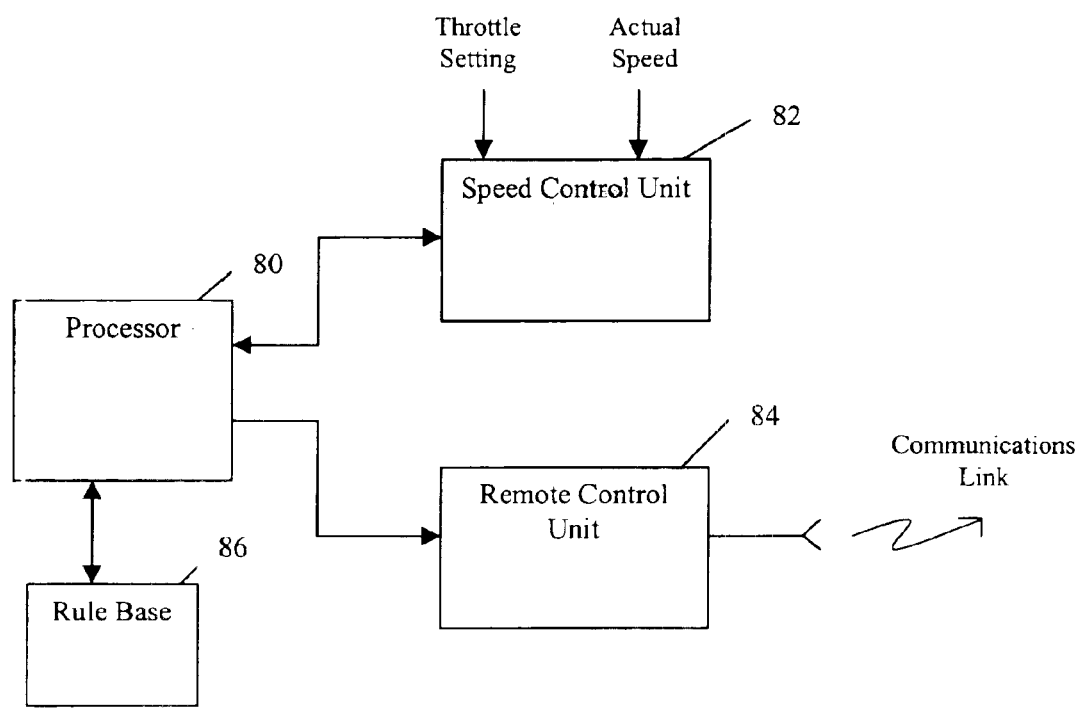
FIG. 1 is a functional block diagram illustrating an apparatus for controlling the slow speed tractive efforts of a locomotive consist.

In certain situations, for reasons of computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

I. General System Description

The present invention advantageously provides accurate and smooth slow speed control (typically speeds less than about 5 miles per hour) of locomotive consists by monitoring total consist tractive effort, controlling the throttle and main generator excitation of a lead locomotive and controlling the throttle of one or more trail locomotives so that the total tractive effort of the consist may be adjusted as needed to maintain a set speed. As a result, aspects of the invention enable slow speed control of locomotive consists comprising trail locomotives that may lack remote main generator excitation control capability. The ability to finely control slow speed operation by varying the main generator excitation is referred to herein as "Slow Speed" capability. Throughout this specification, the consist control locomotive, comprising Slow Speed capability, is referred to as the lead locomotive, and the trail locomotive, lacking remote Slow Speed control and operating under lead locomotive control, is referred to as the trail locomotive. However, the terms "lead" and "trail" refer only to whether the designated locomotive is a Slow Speed equipped control locomotive, or a controlled locomotive, lacking remote Slow Speed capability, respectively, and not to the relative position of the locomotives in the consist.

Aspects of the invention provide slow speed control of locomotive consists by controlling the throttle settings and adjusting the excitation voltage on the lead locomotive in a consist, while controlling the throttle steps on the trail locomotive such that the total tractive effort for the consist is maintained at the required levels needed to maintain a set speed. For example, an actual speed signal and a speed command signal are processed to determine if the consist is traveling at a desired slow speed and if there is a need to increase or reduce the total consist tractive effort. Various communication links, such as a hard wired link, a radio frequency (RF) link or an infrared (IR) link, can be used to provide different levels of control over the entire consist tractive effort. For example, a hard wired MU connection having throttle train lines can be used by the lead locomotive to control the throttle setting of the trail locomotive. As the trail locomotive throttles are stepped up or down by the lead locomotive, a trail locomotive load regulator automatically limits the rate at which the tractive effort will build up or drop off. A Slow Speed equipped lead locomotive controls the lead locomotive load regulator input directly and thus has a faster tractive effort response than the non-Slow Speed equipped trail locomotive. The foregoing relationship, in conjunction with a speed input, allows the total consist tractive effort to be maintained at a fixed level, and thereby eliminates the need to adjust the excitation voltage in the trail locomotive in response to a throttle setting change.

FIG. 1 is a functional block diagram illustrating an apparatus for controlling the slow speed tractive efforts of a locomotive consist. The apparatus comprises a processor 80, a slow speed control unit 82 and a remote control unit 84, and, optionally, a rule base 86, for controlling total consist tractive effort to maintain a desired speed. In an embodiment, the slow speed control unit 82 receives a selected throttle setting input and an actual speed input from the control locomotive and monitors the generator excitation of the control locomotive and provides this information to the processor 80. The speed control unit also receives a generator excitation command from the processor 80 and controls the generator excitation according to the received generator excitation command.

The processor 80, coupled to the locomotive slow speed control unit 82, is programmed to receive throttle setting, actual speed, and generator excitation information from the speed control unit 82. The processor 80 processes the received information to compensate for changes in the total consist tractive effort to maintain a desired speed. Based on the received information, the processor 80 sends a generator excitation command to the speed control unit 82 to adjust the generator excitation of the control locomotive according to the received generator excitation command. In addition, the processor 80, based on the throttle, actual speed, and generator excitation information received from the speed control unit 82, provides a throttle setting command to the remote control unit 84. In an embodiment, the processor 80 processes the received information and provides a generator excitation command and throttle setting command based on rules stored in a rule base 86.

The remote control unit 84, coupled to the processor 80, receives throttle setting commands from the processor 84 to control the throttle setting of the controlled locomotive over a communication link. The communication link may be a hard-wired link, a radio frequency (RF) link, a microwave link, or an infrared (IR) link. In an embodiment, the communications link is a Multiple Unit (MU) connection wherein the MU connection comprises throttle train lines controlled by the remote control unit 84 to set the throttle of each of the controlled locomotives.

By controlling the generator excitation of the control locomotive and the throttle settings in the controlled locomotive, the apparatus advantageously provides slow speed control of the entire consist without having to control the generator excitation of the controlled locomotive.

For illustrative purposes, the maximum tractive effort for each throttle setting has been considered as the switching or throttle step-up point in the following embodiments. In actual practice a threshold limit may be defined which is below the maximum tractive effort.

II. Trail Locomotive Throttle Control Matches Lead Locomotive Throttle Steps

Figure 2:
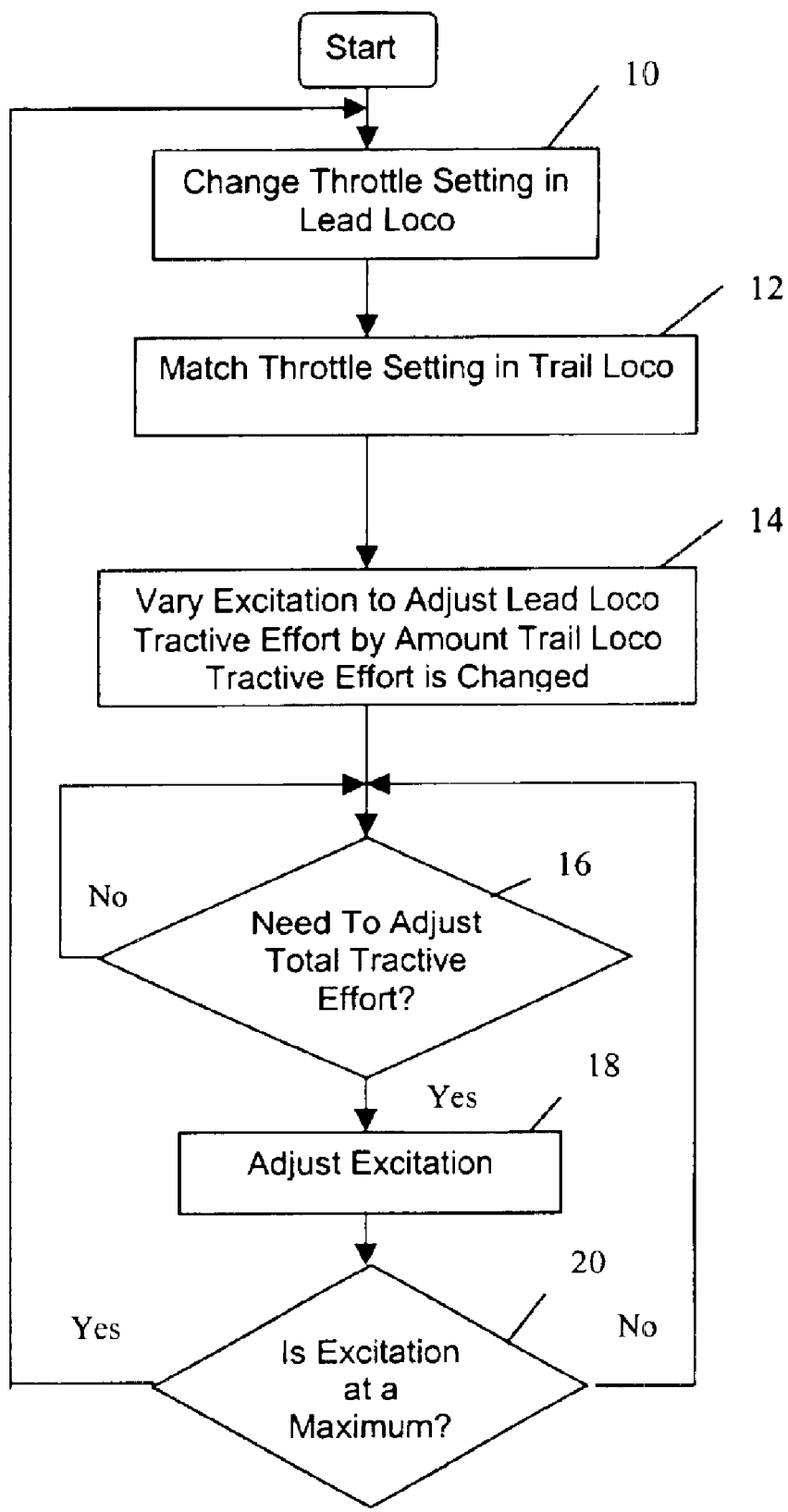
FIG. 2 is a flow chart illustrating a method for slow speed control of locomotive consists wherein the trail locomotive throttle settings match the lead locomotive throttle settings.

FIG. 2 is a flow chart illustrating a method for slow speed control of locomotive consist wherein the trail locomotive throttle settings match the lead locomotive throttle settings. The method begins by changing the throttle setting in a lead locomotive in step 10. For example, changing the throttle setting comprises changing the throttle from an idle setting to throttle setting 1. Upon changing the throttle setting in the lead locomotive, the throttle setting of the trail locomotive is commanded by the lead locomotive to match the same throttle setting as the lead locomotive in step 12. After the trail locomotive throttle setting is changed, in step 14, the lead locomotive varies the lead locomotive's main generator excitation so that the lead locomotive tractive effort is adjusted by the amount of the tractive effort provided by the trail locomotive after the trail locomotive's throttle setting is changed. If additional tractive effort is required to maintain a set speed in step 16, then the lead locomotive increases the lead locomotive main generator excitation in step 18 until the desired speed is attained. Conversely, if less tractive effort is required, such as when the train is going downhill, the lead locomotive main generator excitation can be reduced to maintain the desired speed. Alternatively, if no additional tractive effort is required in step 16, the locomotive speed is monitored until a change in tractive effort is required. If the excitation is increased in step 18 to a maximum excitation in step 20, then the lead locomotive throttle setting is incremented by returning to step 10, and the process is repeated. Alternatively, if the excitation is not at a maximum in step 20, then the process returns to monitoring the speed to determine if additional tractive effort is required in step 16.

The preceding method will now be described by way of example. Table 1 shows exemplary tractive effort control range capabilities for a two locomotive consist where both locomotives operate at the same throttle step.

TABLE 1

Exemplary Tractive Effort Ranges for a Two Locomotive Consist Operating at the Same Throttle Setting.

| | Lead Locomotive | | Trail Locomotive | | Consist | |
|---|---|---|---|---|---|---|
| Throttle Step | Load Regulator Range (v) | Tractive Effort (lbs) | Throttle Step | Tractive Effort (lbs) | Total Tractive Effort (lbs) | Resolution (TE/Volt) |
| Idle | 0 | 0 | Idle | 0 | 0 | 0 |
| 1 | 0–9.6 | 0–13,000 | 1 | 13,000 | 13,000–26,000 | 1350 |
| 2 | 0–16.9 | 0–25,000 | 2 | 25,000 | 25,000–50,000 | 1480 |
| 3 | 0–23.2 | 0–40,000 | 3 | 40,000 | 40,000–80,000 | 1720 |
| 4 | 0–31.8 | 0–60,000 | 4 | 60,000 | 60,000–120,000 | 1880 |
| 5 | 0–37.8 | 0–80,000 | 5 | 80,000 | 80,000–160,000 | 2110 |
| 6 | 0–42.2 | 0–100,000 | 6 | 100,000 | 100,000–200,000 | 2370 |
| 7 | 0–46.5 | 0–123,000 | 7 | 123,000 | 123,000–246,000 | 2640 |
| 8 | 0–50 | 0–135,000 | 8 | 135,000 | 135,000–270,000 | 2700 |

According to an exemplary embodiment, when the lead locomotive is commanded from idle to throttle setting 1, the trail locomotive is similarly commanded from idle to throttle setting 1, and the lead locomotive excitation voltage is set to 0 volts. As shown in Table 1, at the excitation voltage setting of 0 volts, the lead locomotive provides 0 pounds of tractive effort, and the trail locomotive provides 13,000 pounds of tractive effort for the consist. In this example, this would be the minimum tractive effort for the consist with no means of reducing tractive effort if the speed is too high, except by returning to idle. The lead locomotive excitation control would provide the capability for increasing consist tractive effort from 13,000 pounds if the speed at this minimum tractive effort is too low by increasing the lead locomotive main generator excitation.

As the lead locomotive's excitation is increased and the resulting tractive effort reaches the maximum available for the selected throttle step, the consist locomotive throttles need to be increased if more tractive effort is required to maintain a desired speed. For example, if the consist is losing speed while moving uphill, and the lead locomotive's main generator excitation is set to a maximum for the current throttle step, the throttle settings of the consist locomotives will need to be stepped up to increase the total consist tractive effort to maintain the desired speed up the hill. As the throttle setting is stepped up, the trail locomotive increases to the full tractive effort for the commanded throttle setting. To maintain the same total consist tractive effort, the lead locomotive tractive effort is reduced by the same amount that the trail locomotive increased the trail locomotive's tractive effort in response to the lead locomotive's command to throttle up. For example, if the consist is at the upper tractive effort range for throttle setting 3, the consist tractive effort will be 80,000 lbs. as shown in Table 1. When the consist throttle setting is increased to setting 4, the trail locomotive tractive effort increases from 40,000 lbs to 60,000 lbs. To maintain the same 80,000 lbs of consist tractive effort, the lead locomotive reduces its tractive effort from 40,000 lbs to 20,000 lbs. Consequently, the voltage supplied to the load regulator of the lead locomotive is regulated down from 23.2 volts (the maximum excitation at the previous throttle setting of 3) to 10.6 volts to reduce the tractive effort supplied by the lead locomotive and maintain an overall consist tractive effort of 80,000 lbs. during the throttle setting transition. As a result, during the transition from setting 3 to setting 4, 75% of the consist tractive effort comes from the trail locomotive.

Figure 3:
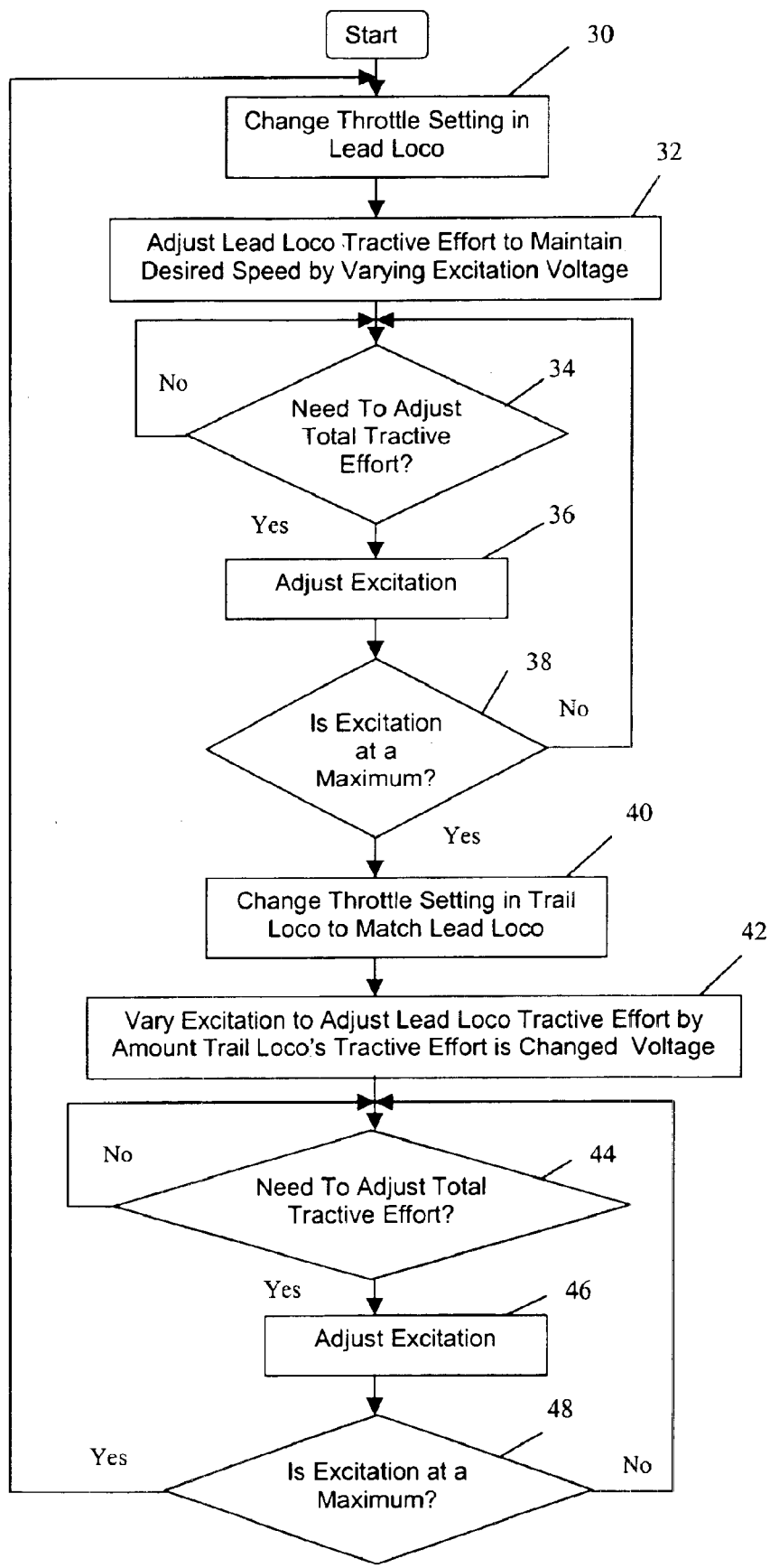
FIG. 3 is a flow chart illustrating a method for slow speed control of locomotive consists wherein the trail locomotive throttle settings are maintained at the same or one throttle setting lower than the lead locomotive.

III. Trail Locomotive Throttles Maintained at Same or One Throttle Setting Lower than Lead Locomotive FIG. 3 is a flow chart illustrating a method for slow speed control of locomotive consists wherein the trail locomotive throttle settings are maintained at the same or one throttle setting lower than the lead locomotive. The method begins by changing the throttle setting in a lead locomotive in step 30. For example, changing the throttle setting comprises changing the throttle from an idle setting to throttle setting1. Upon changing the throttle setting in a lead locomotive, the lead locomotive varies the lead locomotive's main generator excitation to adjust the tractive effort to maintain a desired speed in step 32. If, for example, additional tractive effort is required to maintain a set speed in step 34, then the lead locomotive can increase the lead locomotive main generator excitation in step 36 until the desired speed is attained. Conversely, if less tractive effort is required, such as when the train is going downhill, the lead locomotive main generator excitation can be reduced to maintain the desired speed. Alternatively, if no additional tractive effort is required in step 34, the locomotive speed is monitored until a change in tractive effort is required. In step 38, the process determines if the excitation of the lead locomotive's generator has been increased to a maximum excitation for the current throttle setting. If the excitation is not at a maximum level, the process returns to step 34 to monitor the locomotive speed until a change in tractive effort is required. Alternatively, if the excitation is increased in step 36 to a maximum excitation in step 38, then the throttle setting of the trail locomotive is commanded by the lead locomotive to change to the same throttle setting as the lead locomotive in step 40. After the trail locomotive throttle setting is changed, the lead locomotive, in step 42, reduces the lead locomotive tractive effort by the amount of the tractive effort provided by the trail locomotive after the trail locomotive's throttle setting is changed.

If, in step 44, additional tractive effort is required to maintain a set speed after the trail locomotive's throttle is incremented, then the lead locomotive, in step 46, can increase the lead locomotive main generator excitation until the desired consist speed is attained. If no additional tractive effort is required in step 44, the locomotive consist speed is monitored until a change in tractive effort is required. Alternatively, if the excitation is increased in step 46 to a maximum excitation in step 48, then the process returns to step 30 and the throttle setting in the lead locomotive is incremented one step to increase the lead locomotive's tractive effort, and the process is repeated. Alternatively, if the excitation is not set to a maximum level in step 48, the process returns to step 44 to monitor the locomotive speed until a change in tractive effort is required.

The preceding method will now be described by way of example. Table 2 shows an exemplary tractive effort control range capability for a two locomotive consist wherein the throttle steps of the lead locomotive are maintained at the same or one throttle setting higher than the trail locomotive.

TABLE 2

Exemplary Tractive Effort Ranges for a Two Locomotive Consist Wherein the Throttle Steps of the Lead Locomotive are Maintained at the Same or One Throttle Setting Higher than the Trail Locomotive.

| Lead Locomotive | | | Trail Locomotive | | Consist | |
|---|---|---|---|---|---|---|
| Throttle Step | Load Regulator Range (v) | Tractive Effort (lbs) | Throttle Step | Tractive Effort (lbs) | Total Tractive Effort (lbs) | Resolution (TE/Volt) |
| Idle | 0 | 0 | Idle | 0 | 0 | 0 |
| 1 | 0–9.6 | 0–13,000 | Idle | 0 | 0–13,000 | 1350 |
| 1 | 0–9.6 | 0–13,000 | 1 | 13,000 | 13,000–26,000 | 1350 |
| 2 | 0–16.9 | 0–25,000 | 1 | 13,000 | 13,000–38,000 | 1480 |
| 2 | 0–16.9 | 0–25,000 | 2 | 25,000 | 25,000–50,000 | 1480 |
| 3 | 0–23.2 | 0–40,000 | 2 | 25,000 | 25,000–65,000 | 1720 |
| 3 | 0–23.2 | 0–40,000 | 3 | 40,000 | 40,000–80,000 | 1720 |
| 4 | 0–31.8 | 0–60,000 | 3 | 40,000 | 40,000–100,000 | 1880 |
| 4 | 0–31.8 | 0–60,000 | 4 | 60,000 | 60,000–120,000 | 1880 |
| 5 | 0–37.8 | 0–80,000 | 4 | 60,000 | 60,000–140,000 | 2110 |
| 5 | 0–37.8 | 0–80,000 | 5 | 80,000 | 80,000–160,000 | 2110 |
| 6 | 0–42.2 | 0–100,000 | 5 | 80,000 | 80,000–180,000 | 2370 |
| 6 | 0–42.2 | 0–100,000 | 6 | 100,000 | 100,000–200,000 | 2370 |
| 7 | 0–46.5 | 0–123,000 | 6 | 100,000 | 100,000–223,000 | 2640 |
| 7 | 0–46.5 | 0–123,000 | 7 | 123,000 | 123,000–246,000 | 2640 |
| 8 | 0–50 | 0–135,000 | 7 | 123,000 | 123,000–258,000 | 2700 |
| 8 | 0–50 | 0–135,000 | 8 | 135,000 | 135,000–270,000 | 2700 |

Assuming the lead locomotive is commanded from idle to throttle setting 1, the trail locomotive will be instructed to remain in idle, the lead locomotive throttle will be set to throttle setting 1, and the lead locomotive's main generator excitation will be adjusted from 0 volts to 9.6 volts to selectively provide a tractive effort adjustment range from 0 lbs to 13,000 lbs., respectively. The lead locomotive excitation control allows for increasing or decreasing the consist tractive effort as required, if the speed is too low or too high relative to the desired speed.

When the lead locomotive reaches the maximum excitation range for throttle setting 1, and, assuming a higher speed is still required, the trail locomotive will be set to throttle setting 1. To maintain a constant tractive effort of the consist, as the trail locomotive's tractive effort increases after the trail locomotive's throttle has been incremented, the lead locomotive's tractive effort is decreased a corresponding amount to maintain a consistent speed. In stepping from idle to throttle setting 1, the trail locomotive's contributive tractive effort will increase to 13,000 lbs and the lead locomotive's tractive effort is reduced to 0 lbs. to maintain the consist total tractive effort at 13,000 lbs. During the transition, 50% of the tractive effort will come from the trail locomotive. Consequently, the consist tractive effort control range will be increased from 13,000 lbs to 26,000 lbs. and is varied by adjusting the lead locomotive's main generator excitation. If the speed decreases such that the consist tractive effort needs to be reduced below 13,000 lbs, then the trail locomotive is idled and the lead excitation increased to compensate for the loss of tractive effort from the trail locomotive.

As the tractive effort reaches the maximum available for the selected throttle step, the consist locomotive throttles are increased if additional tractive effort is required to maintain a set speed. For example, the throttle setting increases are changed only for one locomotive at a time, first the lead locomotive, and then the trail locomotive if the lead locomotive, operating at maximum excitation, cannot maintain a desired set speed. To maintain a constant total tractive effort, the lead locomotive tractive effort is reduced to compensate for increases made by the trail locomotive when the trail locomotive's throttle settings are changed. For example, if the consist is at the upper tractive effort range for throttle setting 3, the consist tractive effort will be 80,000 lbs. as shown in Table 2. When the lead locomotive throttle setting is increased to setting 4 to provide additional tractive effort, the trail locomotive will remain in throttle setting 3, provided the tractive effort requirements do not exceed the consist total tractive capability when the lead locomotive is operating at maximum excitation for throttle setting 4. To maintain the same 80,000 lbs of consist tractive effort after incrementing to throttle setting 4, the lead locomotive reduces its tractive effort to 40,000 lbs. by decreasing the lead locomotive main generator excitation. The excitation voltage supplied to the main generator is reduced from 23.2 volts (the maximum excitation at the previous throttle setting of 3) to 21.3 volts to decrease the tractive effort supplied by the lead locomotive and to maintain an overall consist tractive effort of 80,000 lbs during the throttle setting transition. When the lead locomotive transitions from throttle setting 3 to throttle setting 4, 50% of the total consist tractive effort will come from the trail locomotive.

As the tractive effort again reaches the maximum available for the selected throttle setting, the consist locomotive throttles are increased if additional tractive effort is required to maintain a set speed. In the current example, the trail locomotive is stepped up to throttle setting 4 at this point. To maintain the same 100,000 lbs of total consist tractive effort at a lead locomotive throttle setting of 4, the lead locomotive reduces its tractive effort from 60,000 lbs to 40,000 lbs. The voltage supplied to the load regulator of the lead locomotive is reduced from 31.8 volts to 21.3 volts. During the trail locomotive's transition from throttle setting 3 to throttle setting 4, 60% of the total consist tractive effort will come from the trail locomotive.

IV. Lead and Trail Locomotive Throttles Controlled According to Rule Base

Figure 4:
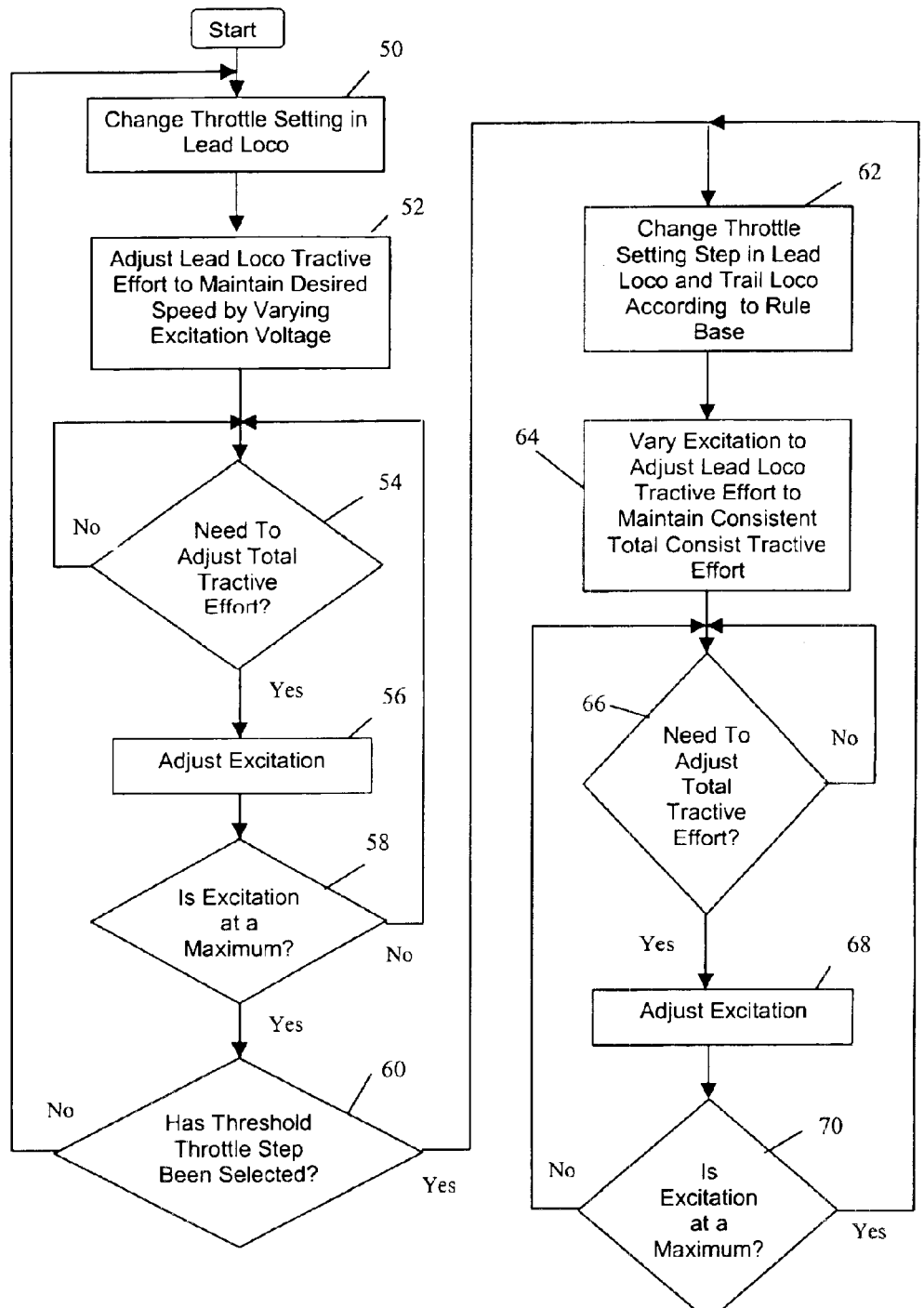
FIG. 4 is a flow chart illustrating a method for slow speed control of locomotive consists wherein the trail locomotive throttle settings and the lead locomotive throttle settings are changed according to a rule base.

FIG. 4 is a flow chart illustrating a method for slow speed control of locomotive consists wherein the trail locomotive throttle settings and the lead locomotive throttle settings are changed according to a rule base. For more even more precise Slow Speed consist operation, wherein the trail locomotives are not remote Slow Speed controllable, the lead locomotive in a consist should maintain the majority of the tractive effort control over the consist. A method for controlling consists in this manner begins by changing the throttle setting in a lead locomotive in step 50. For example, changing the throttle setting comprises changing the throttle from an idle setting to throttle setting 1. Upon changing the throttle setting in the lead locomotive, the lead locomotive varies the lead locomotive's main generator excitation to adjust the tractive effort to maintain a desired speed in step 52. If additional tractive effort is required to maintain a set speed in step 54, then the lead locomotive can increase the lead locomotive main generator excitation in step 56 until the desired speed is attained. Conversely, if less tractive effort is required, such as when the train is going downhill, the lead locomotive main generator excitation can be reduced to maintain the desired speed. Alternatively, if no additional tractive effort is required in step 54, the locomotive speed is monitored until a change in tractive effort is required.

In step 58, the process determines if the excitation of the lead locomotive's generator has been increased to a maximum excitation. If the excitation is not at a maximum level, the process returns to step 54 to monitor the locomotive consist speed until a change in tractive effort is required. Alternatively, if the excitation has been increased in step 56 to a maximum excitation in step 58, then the process determines if a predetermined threshold throttle setting has been selected in step 60. For example, the predetermined threshold throttle setting is chosen as an intermediary throttle setting between a minimum throttle setting and a maximum throttle setting, such as throttle setting 5. If the predetermined throttle threshold has not been selected in step 60, then the process returns to step 50 and the lead locomotive's throttle setting is changed. However, if the predetermined throttle threshold has been selected, then the lead locomotive's throttle and the trail locomotive's throttle are changed according to a rule base in step 62. For example, the lead locomotive's main generator excitation and the trail locomotive's throttle settings are set corresponding to the lead locomotive's commanded throttle setting according to the rule base of Table 3. As a further example, if the current throttle setting of the lead locomotive is throttle setting 7, the lead locomotive's main generator excitation is set to 46.5 volts, the trail locomotive throttle setting is 3, and a higher speed is required, then the lead locomotive's throttle setting should be set to 8 according to the rule base to provide additional tractive effort while the trail locomotive throttle setting remains at 3.

In an embodiment, a rule base comprising predetermined points at which the lead and trail locomotives adjust their respective throttle settings are stored in a look-up table for reference by the slow speed controller process. However, a look-up table is only one example of a method to store a rule base, and equivalent methods to provide dynamic throttle and excitation setting rules and data can be used by those skilled in the art. Further, similar rule bases may be established for consists comprising more than one trail locomotive or more then one, lead locomotive, wherein the throttle and excitation setting are allocated according to the specific consist configuration.

TABLE 3

Consist Tractive Effort Range and Settings for Throttle Control wherein the Trail Throttle Setting Lags the Lead Throttle Settings

| Lead Loco | | | | Trail Loco | | Consist |
|---|---|---|---|---|---|---|
| Throttle Step | Load Regulator | Tractive Effort | Resolution TE/Volt | Throttle Step | Tractive Effort | Tractive Effort |
| Idle | 0 | 0 | 0 | Idle | 0 | 0 |
| 1 | 0–9.6 | 0–13,000 | 1350 | Idle | 0 | 0–13,000 |
| 2 | 0–16.9 | 0–25,000 | 1480 | Idle | 0 | 0–25,000 |
| 3 | 0–23.2 | 0–40,000 | 1720 | Idle | 0 | 0–40,000 |
| 4 | 0–31.8 | 0–60,000 | 1880 | Idle | 0 | 0–60,000 |
| 5 | 0–37.8 | 0–80,000 | 2110 | Idle | 0 | 0–80,000 |
| 5 | 31.8 | 67,000 | 2110 | 1 | 13,000 | 80,000 |
| 5 | 0–37.8 | 0–80,000 | | 1 | 13,000 | 13,000–93,000 |
| 5 | 32.2 | 68,000 | 2110 | 2 | 25,000 | 93,000 |
| 5 | 0–37.8 | 0–80,000 | | 2 | 25,000 | 25,000–105,000 |
| 5 | 30.8 | 65,000 | 2110 | 3 | 40,000 | 105,000 |
| 5 | 0–37.8 | 0–80,000 | | 3 | 40,000 | 40,000–120,000 |
| 6 | 33.8 | 80,000 | 2370 | 3 | 40,000 | 120,000 |
| 6 | 0–42.2 | 0–100,000 | | 3 | 40,000 | 40,000–140,000 |
| 7 | 37.9 | 100,000 | 2640 | 3 | 40,000 | 140,000 |
| 7 | 0–46.5 | 0–123,000 | | 3 | 40,000 | 40,000–163,000 |
| 8 | 45.6 | 123,000 | 2700 | 3 | 40,000 | 163,000 |
| 8 | 0–50 | 0–135,000 | | 3 | 40,000 | 40,000–175,000 |
| 8 | 42.6 | 115,000 | 2700 | 4 | 60,000 | 175,000 |
| 8 | 0–50 | 0–135,000 | | 4 | 60,000 | 60,000–195,000 |
| 8 | 42.6 | 115,000 | 2700 | 5 | 80,000 | 195,000 |
| 8 | 0–50 | 0–135,000 | | 5 | 80,000 | 80,000–215,000 |
| 8 | 42.6 | 115,000 | 2700 | 6 | 100,000 | 215,000 |
| 8 | 0–50 | 0–135,000 | | 6 | 100,000 | 100,000–235000 |
| 8 | 41.5 | 112,000 | 2700 | 7 | 123,000 | 235,000 |
| 8 | 0–50 | 0–135,000 | | 7 | 123,000 | 123,000–258,000 |
| 8 | 45.6 | 123,000 | 2700 | 8 | 135,000 | 258,000 |
| 8 | 0–50 | 0–135,000 | | 8 | 135,000 | 135,000–270,000 |

After the lead locomotive's and the trail locomotive's throttles have been adjusted according to the rule base, the lead locomotive, in step 64, adjusts the lead locomotive tractive effort by varying the lead locomotive generator excitation to maintain a consistent total consist tractive effort. If, in step 66, additional tractive effort is required to maintain a set speed after setting the trail locomotive's and lead locomotive's throttles, then the lead locomotive, in step 68, can increase the lead locomotive main generator excitation until the desired consist speed is attained. Alternatively, if no additional tractive effort is required in step 66, the locomotive consist speed is monitored until a change in tractive effort is required. If the excitation is increased in step 68 to a maximum excitation in step 70, then the process returns to step 62 and the throttle settings in the lead locomotive and the trail locomotive are set according to the predetermined schedule. Alternatively, if the excitation is not set to a maximum level in step 70, the process returns to step 66 to monitor the locomotive speed until a change in tractive effort is required.

The preceding method will now be described by way of example. As shown in Table 3, the predetermined threshold throttle setting of the lead locomotive may be an intermediate throttle setting, such as throttle setting 5. The trail locomotive throttle setting is kept at idle until the lead locomotive reaches maximum generator excitation at throttle setting 5. When the consist moves from idle up to throttle setting 5, the trail locomotive is instructed to remain in idle, and the lead locomotive provides slow speed control operation by stepping up and stepping down throttles and adjusting the excitation voltage as required to maintain the set speed.

The exemplary configuration depicted in Table 3 provides lead locomotive throttle control for throttle settings 1–5 and excitation voltage control from 0 volts to 37.8 volts, thereby providing a total consist tractive effort control from 0 lbs to 80,000 lbs. The lead locomotive excitation control allows for increasing or decreasing the consist tractive effort, as required, if the speed is too low or too high.

When the lead locomotive excitation reaches the maximum range for throttle setting 5 (excitation voltage=37.8 volts and tractive effort=80,000 pounds) and more tractive effort is required, the trail locomotive will then be set to throttle setting 1. To maintain a constant tractive effort on the consist, as the trail locomotive's tractive effort increases, the lead locomotive's tractive effort is decreased accordingly. In the case of setting the trail locomotive's throttle setting to 1, the trail locomotive's tractive effort increases to 13,000 lbs and the lead locomotive's tractive effort is reduced to 67,000 lbs. to maintain the total consist tractive effort at 80,000 lbs. To accomplish the lead locomotive's traction effort reduction, the lead locomotive main generator excitation voltage is reduced from 37.8 volts to 31.8 volts to achieve a 67,000 pound tractive effort from the lead locomotive. In the transition from idle to throttle setting 1, the trail locomotive increases the trail locomotive's main generator excitation voltage at a fixed rate, limited by a rate control module in the trail locomotive. As the trail locomotive's excitation voltage builds up, the trail locomotive tractive effort increases, resulting in an increase in speed. The lead locomotive detects this increase in speed and drops the lead locomotive excitation voltage to compensate for the increase in speed by reducing the tractive effort.

The lead locomotive, having Slow Speed capability, controls the lead locomotive excitation voltage and feeds the voltage directly to a load regulator, which reacts very quickly to voltage changes and, consequently, controls the lead locomotive's tractive effort very quickly. In contrast, the trail locomotive, lacking remote Slow Speed capability, increases its tractive effort to 13,000 pounds at a rate controlled by a load regulator when commanded to increase it throttle setting from idle to throttle setting 1 by the lead locomotive. In response to the trail locomotive's increasing tractive effort, the lead locomotive reduces it tractive effort by 13,000 pounds to compensate and maintain a constant 80,000 pounds of consist total tractive effort.

As the tractive effort reaches the maximum available for the selected throttle step, the consist locomotive throttles are increased if additional tractive effort is required to maintain a set speed. To maintain the same consist tractive effort, the lead locomotive reduces its tractive effort when the trail locomotive's throttle is increased. The disclosed method compensates for the increase in tractive effort supplied by the trail locomotive as the trail locomotive's throttle setting is stepped by reducing the voltage supplied to excite the lead locomotives main generator.

While the preferred embodiments of the present invention have been shown and described herein, it will be obvious that such embodiments are provided by way of example only. Numerous variations, changes and substitutions will occur to those of skill in the art without departing from the invention herein. In particular, the methods may be adapted to control a plurality of trail locomotives by a lead locomotive and any combinations thereof. In addition, controlled power reduction, such as dynamic braking, may be accomplished by performing reverse procedures. For example, when less power is needed to maintain a set speed, the lead locomotive main generator can be reduced to reduce the total lead locomotive's tractive effort. If the main generator excitation is reduced so that only the trail locomotive is providing tractive power to the consist, the trail locomotive can be commanded to reduce its throttle setting and the lead locomotive's excitation can then be increased to compensate for the loss of tractive power from the trail locomotive. Accordingly, it is intended that the invention be limited only by the spirit and scope of the appended claims.

What is claimed is:

1. A method of controlling slow speed operations of a railroad locomotive consist comprising a control locomotive and at least one controlled locomotive, with each locomotive having an engine with discrete throttle settings, an electric generator driven by the engine and traction motors for propelling the locomotive driven by power from the electric generator, the method comprising:

receiving a signal indicative of a desired consist travel speed;

configuring a processor on the control locomotive for selecting a respective throttle setting from a plurality of throttle settings of the control locomotive, the selected setting configured to produce a first tractive effort from the control locomotive;

issuing a throttle setting command at the control locomotive;

remotely controlling a throttle setting of the at least one controlled locomotive to produce a predetermined second tractive effort corresponding to the throttle setting of the at least one controlled locomotive, with the first and second tractive efforts together constituting a total consist tractive effort for achieving a consist travel speed;

receiving a signal indicative of an actual consist travel speed;

determining if the actual consist travel speed is different from the desired consist travel speed; and when the actual consist travel speed differs from the desired consist travel speed, adjusting an excitation voltage of the electric generator of the control locomotive to achieve a first tractive effort nd a resultant total consist tractive effort for propelling the consist at the desired consist travel speed.

2. The method of claim 1, wherein each of the controlled locomotives is coupled to and controllable by the control locomotive over a communication link.

3. The method of claim 2, wherein the communication link is selected from the group consisting of a hard-wired link, a radio frequency (RF) link, a microwave link, and an infrared (IR) link.

4. The method of claim 3, wherein the hard-wired link comprises an intra-consist connection.

5. The method of claim 4, wherein the intra-consist connection comprises throttle train lines capable of being controlled by the control locomotive to set the throttle of each of the controlled locomotives.

6. The method of claim 1, wherein the throttle of each of the controlled locomotives is increased at least one throttle setting, and the control locomotive compensates for a resulting increased total consist tractive effort by reducing the excitation voltage of the electric generator of the control locomotive.

7. The method of claim 1, wherein the throttle of each of the controlled locomotives is decreased at least one throttle setting and the control locomotive compensates for a resulting decreased total consist tractive effort by increasing the excitation voltage of the electric generator of the control locomotive.

8. The method of claim 1 wherein the throttle setting of each of the controlled locomotives is changed concurrently with a throttle setting change in the control locomotive.

9. The method of claim 1 wherein the throttle setting of each of the controlled locomotives is changed upon the excitation voltage of the electric generator of the control locomotive reaching a maximum excitation.

10. The method of claim 1, wherein the throttle setting of each of the controlled locomotives is changed upon the control locomotive throttle setting being set to a predetermined setting and the excitation voltage of the electric generator of the control locomotive reaching a maximum excitation at the predetermined throttle setting.

11. The method of claim 10, wherein the predetermined throttle setting is an intermediate throttle setting relative to a maximum and minimum throttle setting range.

12. The method of claim 1, wherein the throttle settings of the control locomotive and each of the controlled locomotives are changed according to values maintained in a rule base.

13. The method of claim 12, wherein the rule base is a throttle setting and generator excitation look-up table.

14. An apparatus for controlling slow speed operations of a railroad locomotive consist comprising a control locomotive and at least one controlled locomotive, with each locomotive having an engine with discrete throttle settings, an electric generator driven by the engine and traction motors for propelling the locomotive driven by power from the electric generator, the system comprising:

a speed control unit responsive to a signal indicative of desired consist travel speed and selecting a respective throttle setting and excitation voltage of the generator of the control locomotive to produce a first tractive effort from the control locomotive;

a remote control unit issuing a throttle setting command at the control locomotive for remotely controlling a throttle setting of the at least one controlled locomotive to produce a predetermined second tractive effort corresponding to the throttle setting of the at least one controlled locomotive, with the first and second tractive efforts together constituting a total consist tractive effort for achieving a consist travel speed; and a processor coupled to the speed control unit and the remote control unit receiving a signal indicative of an actual consist travel speed, the processor programmed to determine if the actual consist travel speed is different from the desired consist travel speed and, when the actual consist travel speed differs from the desired consist travel speed, to adjusting an excitation voltage of the control locomotive to achieve a first tractive effort and a resultant total consist tractive effort for propelling the consist at the desired consist travel speed.

15. The apparatus of claim 14, wherein each of the controlled locomotives is coupled to and controllable by the control locomotive over a communication link.

16. The apparatus of claim 15, wherein the communication link is selected from the group consisting of a hard-wired link, a radio frequency (RF) link, a microwave link, and an infrared (IR)link.

17. The apparatus of claim 16, wherein the hard-wired link comprises an intra-consist connection.

18. The apparatus of claim 17, wherein the intra-consist connection comprises throttle train lines capable of being controlled by the control locomotive to set the throttle of each of the controlled locomotives.

19. The apparatus of claim 14 wherein the throttle setting of each of the controlled locomotives is changed concurrently with a throttle setting change in the control locomotive.

20. The apparatus of claim 14, wherein the throttle of each of the controlled locomotives is increased at least one throttle setting, and the control locomotive compensates for a resulting increased total consist tractive effort by reducing the excitation voltage of the electric generator of the control locomotive.

21. The apparatus of claim 14, wherein the throttle of each of the controlled locomotives is decreased at least one throttle setting and the control locomotive compensates for a resulting decreased total consist tractive effort by increasing the excitation voltage of the electric generator of the control locomotive.

22. The apparatus of claim 14 wherein the throttle setting of each of the controlled locomotives is changed upon the excitation voltage of the electric generator of the control locomotive reaching a maximum excitation.

23. The apparatus of claim 14, wherein the throttle setting of each of the controlled locomotives is changed upon the controlling locomotive throttle setting being set to a predetermined setting and the excitation voltage of the electric generator of the control locomotive reaching a maximum excitation at the predetermined throttle setting.

24. The apparatus of claim 23, wherein the predetermined throttle setting is an intermediate throttle setting relative to a maximum and a minimum throttle setting range.

25. The apparatus of claim 14, wherein the throttle settings of the control locomotive and each of the controlled locomotives are changed according to values maintained in a rule base.

26. The apparatus of claim 25, wherein the rule base is maintained in a throttle setting and generator excitation look-up table.

* * * * *